(12) United States Patent
Masamura et al.

(10) Patent No.: US 11,449,200 B2
(45) Date of Patent: Sep. 20, 2022

(54) VEHICULAR DISPLAY DEVICE AND DISPLAY METHOD IN VEHICULAR DISPLAY DEVICE

(71) Applicant: TOYOTA JIDOSHA KABUSHIKI KAISHA, Toyota (JP)

(72) Inventors: Koichi Masamura, Toyota (JP); Koji Aikawa, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/302,198

(22) Filed: Apr. 27, 2021

(65) Prior Publication Data
US 2021/0247880 A1 Aug. 12, 2021

Related U.S. Application Data

(63) Continuation of application No. 15/837,779, filed on Dec. 11, 2017, now Pat. No. 11,048,380.

(30) Foreign Application Priority Data

Dec. 26, 2016 (JP) .............................. JP2016-252022

(51) Int. Cl.
*G06F 3/0482* (2013.01)
*B60K 35/00* (2006.01)
(Continued)

(52) U.S. Cl.
CPC ............ *G06F 3/0482* (2013.01); *B60K 35/00* (2013.01); *B60K 37/02* (2013.01); *G06F 3/0484* (2013.01);
(Continued)

(58) Field of Classification Search
CPC ............... G06F 3/0482; G06F 3/0484; G06F 2203/04803; G06F 3/048; B60K 35/00;
(Continued)

(56) References Cited

U.S. PATENT DOCUMENTS

2007/0124041 A1* 5/2007 Kwon ................ H04N 21/4314
701/408
2008/0168156 A1 7/2008 Haff et al.
(Continued)

FOREIGN PATENT DOCUMENTS

CN 103733171 A 4/2014
EP 3031656 A1 6/2016
(Continued)

*Primary Examiner* — Angie Badawi
(74) *Attorney, Agent, or Firm* — Hunton Andrews Kurth LLP

(57) ABSTRACT

A vehicular display device includes a display panel and an electronic control unit. The display panel includes a main multi-display area configured to display a first content, and a sub multi-display area configured to display a second content. The electronic control unit is configured to receive one or more selection contents selected by a user, select a content to be displayed as one or both of the first content and the second content among a plurality of contents including the selection content, select the selection content as the first content or the second content depending on a situation of the vehicle, and display the selection content selected as the first content or the second content on the main multi-display area or the sub multi-display area.

20 Claims, 15 Drawing Sheets

(51) Int. Cl.
*B60K 37/02* (2006.01)
*G06F 3/0484* (2022.01)

(52) U.S. Cl.
CPC ....... *B60K 2370/11* (2019.05); *B60K 2370/12* (2019.05); *B60K 2370/152* (2019.05); *B60K 2370/154* (2019.05); *B60K 2370/155* (2019.05); *B60K 2370/164* (2019.05); *B60K 2370/166* (2019.05); *B60K 2370/174* (2019.05); *B60K 2370/179* (2019.05); *B60K 2370/182* (2019.05); *B60K 2370/186* (2019.05); *B60K 2370/1868* (2019.05); *B60K 2370/52* (2019.05); *B60Y 2400/92* (2013.01); *G06F 2203/04803* (2013.01); *Y02T 10/84* (2013.01)

(58) Field of Classification Search
CPC ................ B60K 37/02; B60K 2370/11; B60K 2370/12; B60K 2370/152; B60K 2370/154; B60K 2370/155; B60K 2370/164; B60K 2370/166; B60K 2370/174; B60K 2370/179; B60K 2370/182; B60K 2370/186; B60K 2370/1868; B60K 2370/52; B60K 37/06; B60Y 2400/92; Y02T 10/84; B60R 16/02; G02F 1/13

See application file for complete search history.

(56) References Cited

U.S. PATENT DOCUMENTS

| | | | |
|---|---|---|---|
| 2010/0174443 A1* | 7/2010 | Kubota | G07C 5/006 |
| | | | 701/29.5 |
| 2011/0090074 A1 | 4/2011 | Kuno et al. | |
| 2011/0163864 A1 | 7/2011 | Watanabe et al. | |
| 2014/0152433 A1 | 6/2014 | Sugiyama et al. | |
| 2014/0365120 A1* | 12/2014 | Vulcano | G01C 21/3617 |
| | | | 701/532 |
| 2016/0034181 A1 | 2/2016 | Norris, III | |
| 2016/0167514 A1 | 6/2016 | Nishizaki et al. | |

FOREIGN PATENT DOCUMENTS

| | | |
|---|---|---|
| JP | 2010208566 A | 9/2010 |
| JP | 2012062056 A | 3/2012 |
| JP | 2016107947 A | 6/2016 |
| JP | 2016144959 A | 8/2016 |
| KR | 20100138530 A | 12/2010 |
| KR | 20130058995 A | 6/2013 |

* cited by examiner

| PRIORITY | INFORMATION |
|---|---|
| HIGH | EMERGENCY BRAKING<br>ALERT FOR FAILURE |
| LOW | ACTIVATION STATE OF RCC/LDA<br>DOOR OPENING<br>AUDIO<br>ALERT INDICATING THAT RCC/LDA IS NOT AVAILABLE |

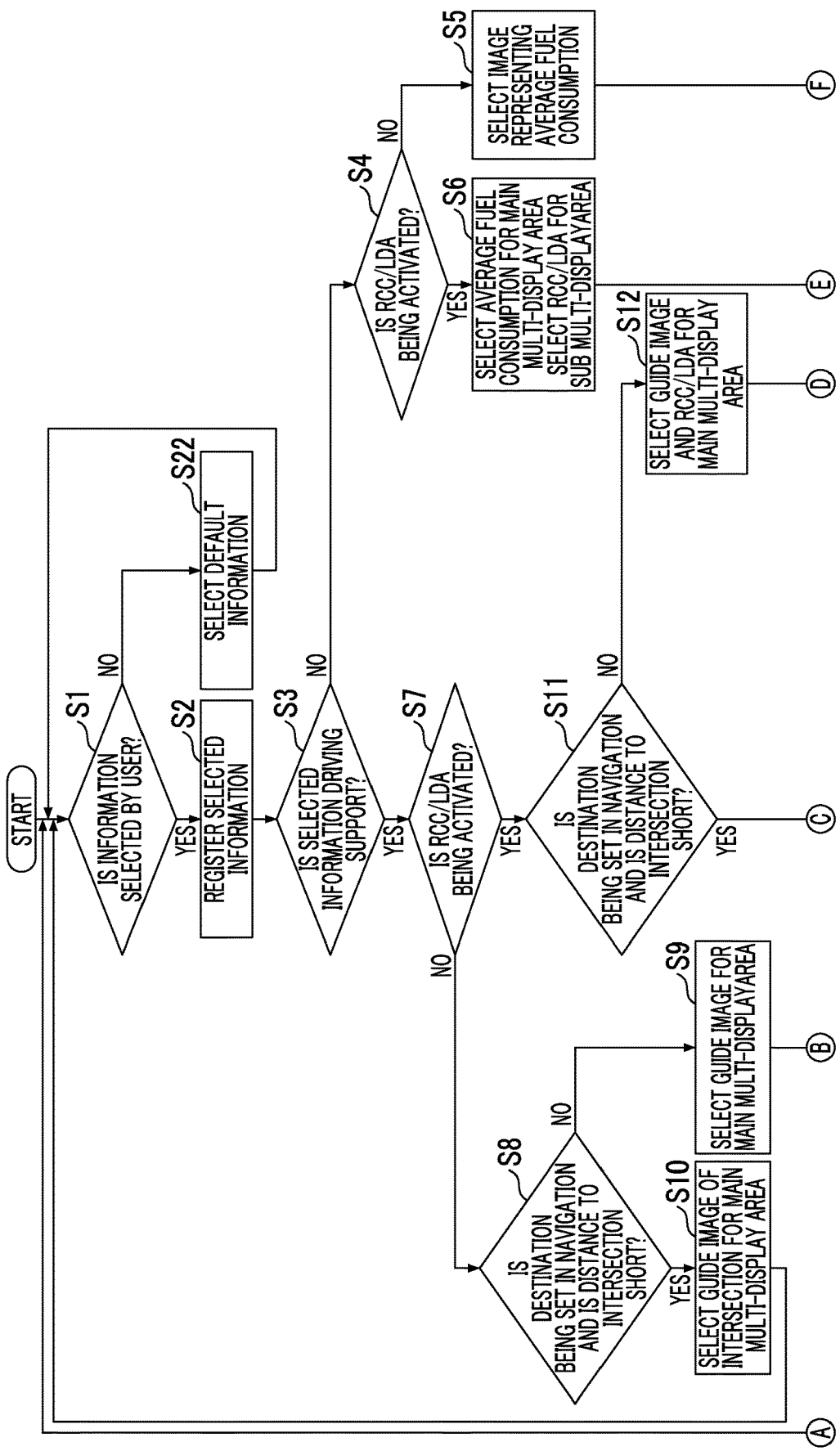

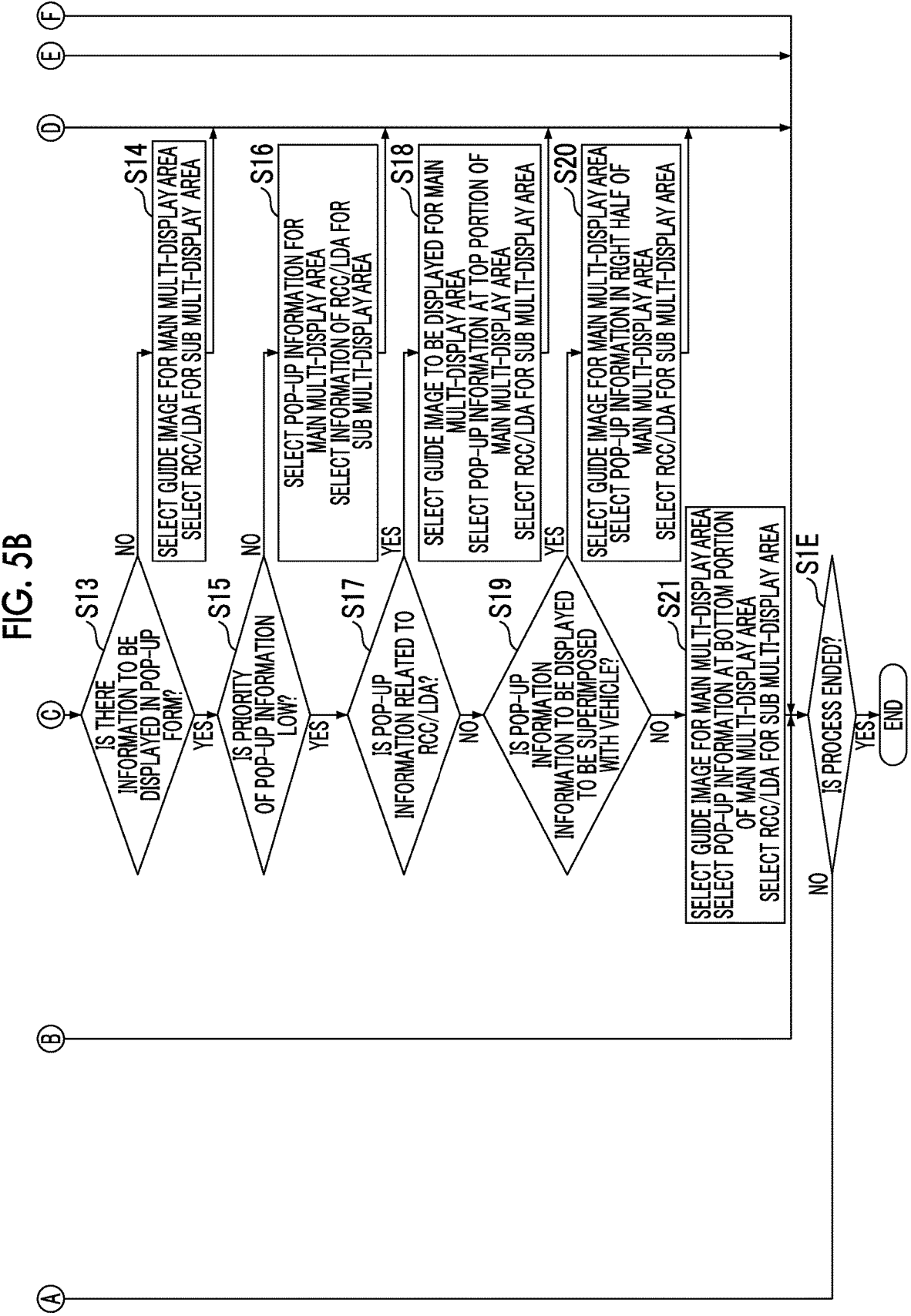

VEHICULAR DISPLAY DEVICE AND DISPLAY METHOD IN VEHICULAR DISPLAY DEVICE

INCORPORATION BY REFERENCE

This is a continuation application of U.S. patent application Ser. No. 15/837,779, filed Dec. 11, 2017, which claims the disclosure of Japanese Patent Application No. 2016-252022 filed on Dec. 26, 2016, all of which, including the specification, drawings and abstract are incorporated herein by reference in their entirety.

BACKGROUND

1. Technical Field

The disclosure relates to a vehicular display device and a display method in a vehicular display device.

2. Description of Related Art

In the related art, non-meter image function components are laid out as inter-meter information output units so as to be positioned in a wedge-like inter-meter space which is formed between a top portion on an inner side on which adjacent arc-shaped dials of two rotating pointer type analog meters face each other and an upper edge of a screen. There is a vehicular meter unit that performs stereoscopic image processing such that a component group including the inter-meter information output units together with the analog meters is visually perceived as if this component group is present ahead of another component group in a depth direction (see, for example, Japanese Unexamined Patent Application Publication No. 2012-062056 (JP 2012-062056 A)).

SUMMARY

The vehicular meter unit of the related art displays various meters and inter-meter information output units on a liquid crystal panel. Various information items related to a vehicle may be displayed on the inter-meter information output units. In recent years, as the number of in-vehicle devices increases, the number of information items to be displayed on multi-display areas such as the inter-meter output units increases.

However, appropriate information may not be displayed on the multi-display area for a user. For example, when the user selects information to be displayed on the multi-display area and information to be displayed on the multi-display area is generated depending on a driving situation of the vehicle, the information selected by the user may be hidden by another information, and thus, the selected information may not be displayed.

The disclosure provides a vehicular display device that displays appropriate information for a user and a display method in the vehicular display device.

A first aspect of the disclosure relates to a vehicular display device including a display panel and an electronic control unit. The display panel includes a main multi-display area configured to display one or more first contents, and a sub multi-display area configured to display one or more second contents. The electronic control unit is configured to receive one or more selection contents selected by a user, select a content to be displayed among a plurality of contents including the one or more selection contents, as one or both of the one or more first contents and the one or more second contents, select the one or more selection contents as the one or more first contents or the one or more second contents depending on a situation of the vehicle, and display the one or more selection contents selected as the one or more first contents or the one or more second contents on the main multi-display area or the sub multi-display area.

Thus, it is possible to constantly display the selection content on any one of the main multi-display area and the sub multi-display area.

Accordingly, it is possible to provide the vehicular display device that displays appropriate information for the user.

In the vehicular display device according to the first aspect of the disclosure, the electronic control unit may be configured to select a content to be provided to the user, as the one or more first contents, and select the one or more selection contents as the one or more second contents when the one or more selection contents are selected as the one or more first contents and the content to be provided to the user is generated depending on a driving situation of the vehicle in addition to the one or more selection contents. The electronic control unit may be configured to display the content to be provided to the user which is selected as the one or more first contents on the main multi-display area and display the one or more selection contents selected as the one or more second contents on the sub multi-display area.

Thus, it is possible to display the selection content on the sub multi-display area even when the content to be provided to the user is generated in addition to the selection content.

Accordingly, it is possible to provide the vehicular display device that displays appropriate information for the user even when the content to be provided to the user is generated in addition to the selection content.

In the vehicular display device according to the first aspect of the disclosure, the electronic control unit may be configured to select the one or more selection contents as the one or more second contents, and select the content to be provided to the user as a pop-up content to be displayed in a pop-up form on the one or more first contents when the one or more selection contents are selected as the one or more first contents and the content to be provided to the user is generated depending on a driving situation of the vehicle in addition to the one or more selection contents. The electronic control unit may be configured to display the pop-up content on the main multi-display area, and display the one or more selection contents selected as the one or more second contents on the sub multi-display area.

Thus, it is possible to display the selection content on the sub multi-display area even when the content to be provided to the user is generated in addition to the selection content and is displayed on the first content in the pop-up form.

Accordingly, it is possible to provide the vehicular display device that displays appropriate information for the user even when the content to be provided to the user is generated in addition to the selection content and is displayed on the first content in the pop-up form.

In the vehicular display device according to the first aspect of the disclosure, the electronic control unit may be configured to display the pop-up content such that the higher a predetermined priority is, the larger the pop-up content is displayed and the lower the predetermined priority is, the smaller the pop-up content is displayed.

Thus, it is possible to display the pop-up content such that the higher the predetermined priority is, the more the pop-up content is conspicuous (can be easily noticed).

Accordingly, it is possible to provide the vehicular display device that displays appropriate information for the user by changing a noticeable degree depending on the priority.

In the vehicular display device according to the first aspect of the disclosure, the electronic control unit may display the pop-up content of which the predetermined priority is high on the whole main multi-display area in the pop-up form.

In the vehicular display device according to the first aspect of the disclosure, the content to be provided to the user may information related to multimedia.

Thus, it is possible to display various information items on the main multi-display area depending on the driving situation of the vehicle while displaying the selection information on the sub multi-display area.

Accordingly, it is possible to provide the vehicular display device that displays appropriate information for the user by displaying the selection information on the sub multi-display area and displaying various information items on the main multi-display area depending on the driving situation of the vehicle.

A second aspect of the disclosure relates to a display method in a vehicular display device that includes an electronic control unit which is configured to receive one or more selection contents selected by a user, a main multi-display area configured to display one or more first contents, and a sub multi-display area configured to display one or more second contents. The display method in the vehicular display device includes: receiving, by the electronic control unit, the one or more selection contents selected by the user; selecting, by the electronic control unit, a content to be displayed as one or both of the one or more first contents and the one or more second contents among a plurality of contents including the one or more selection contents; selecting, by the electronic control unit, the one or more selection contents as the one or more first contents or the one or more second contents depending on a situation of the vehicle; and displaying, by the electronic control unit, the one or more selection contents selected as the one or more first contents or the one or more second contents on the main multi-display area or the sub multi-display area.

Thus, it is possible to constantly display the selection content on any one of the main multi-display area and the sub multi-display area.

Accordingly, it is possible to provide the display method in the vehicular display device that displays appropriate information for the user.

It is possible to provide the vehicular display device that displays appropriate information for the user and the display method in the vehicular display device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a diagram showing a flowchart representing process performed by the meter ECU;

FIG. 5B is a diagram showing a flowchart representing process performed by the meter ECU;

DETAILED DESCRIPTION OF EMBODIMENTS

Hereinafter, an embodiment to which a vehicular display device and a display method in the vehicular display device applies will be described.

Embodiment

Figure 1:
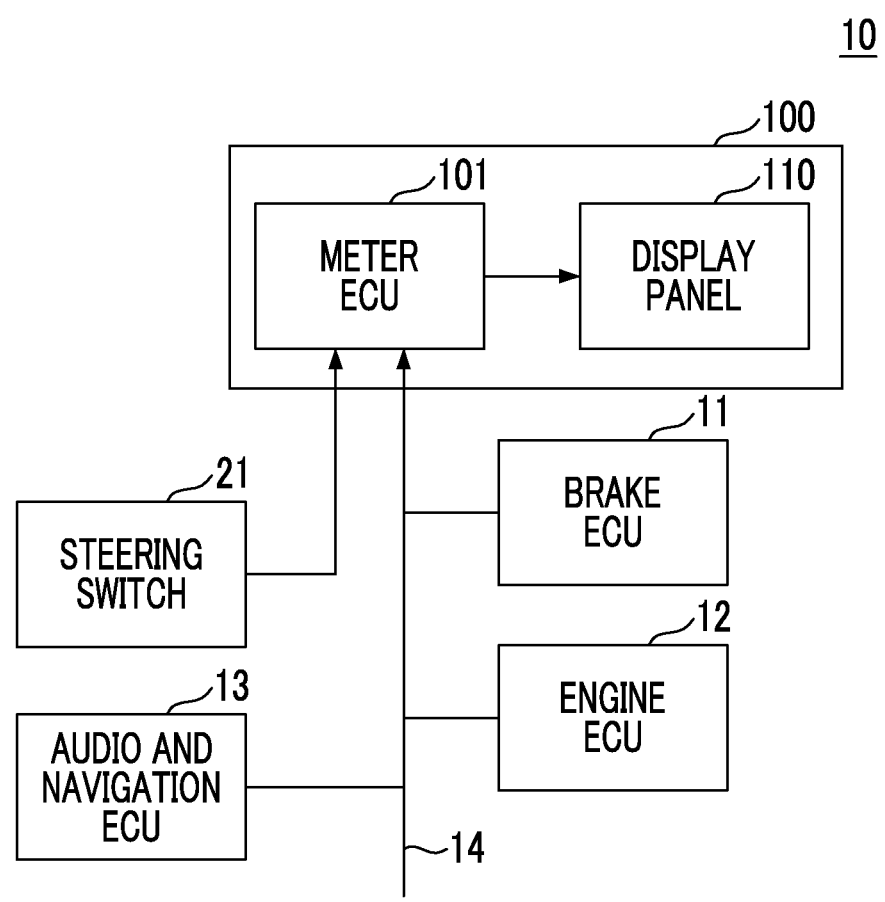
FIG. 1 is a diagram showing a vehicle network system including a vehicular display device according to an embodiment.

FIG. 1 is a diagram showing a vehicle network system 10 including a vehicular display device 100 according to the embodiment.

The vehicle network system 10 includes the vehicular display device 100, a brake electronic control unit (ECU) 11, an engine ECU 12, an audio and navigation ECU 13, a bus 14, and a steering switch 21. The vehicular display device 100 includes a meter ECU 101 and a display panel 110. The meter ECU 101 is an example of an electronic control unit.

The vehicular display device 100, the brake ECU 11, the engine ECU 12, and the audio-navigation ECU 13 are connected through the bus 14. The brake ECU 11 controls brakes of a vehicle, the engine ECU 12 controls an engine, and the audio-navigation ECU 13 controls audio and navigation systems.

Instead of the engine ECU 12, an HV-ECU that controls an engine or the output of a driving motor may be used in a hybrid vehicle (HV), and an EV-ECU that controls the output of a driving motor may be used in an electric vehicle (EV). The ECUs (101, 11, 12, 13) shown in FIG. 1 are examples of the ECUs of the vehicle, and many ECUs are connected to the bus 14 in reality.

The ECUs of the vehicle that includes the meter ECU 101, the brake ECU 11, the engine ECU 12, and the audio and navigation ECU 13 are implemented, for example, by a computer that includes a central processing unit (CPU), a random-access memory (RAM), a read-only memory (ROM), a clock generator unit, an input and output interface, a communication interface, a transmission and reception unit, and an internal bus.

For example, the bus 14 is a communication line that establishes a Controller Area Network (CAN), and communicates data items between the meter ECU 101, the brake ECU 11, the engine ECU 12, the audio and navigation ECU 13, and other ECUs (not shown).

For example, the steering switch 21 is a switch provided at a portion of a spoke of a steering wheel, and is used to select various information items to be displayed on the display panel 110. For example, the steering switch 21 may be a switch capable of being moved in the crisscross direction, or may freely select hierarchical data.

The vehicular display device 100 is a meter unit in which the meter ECU 101 and the display panel 110 are provided as a single unit. For example, the display panel 110 is provided within a meter console of a dashboard in front of a driver seat.

Figure 2:
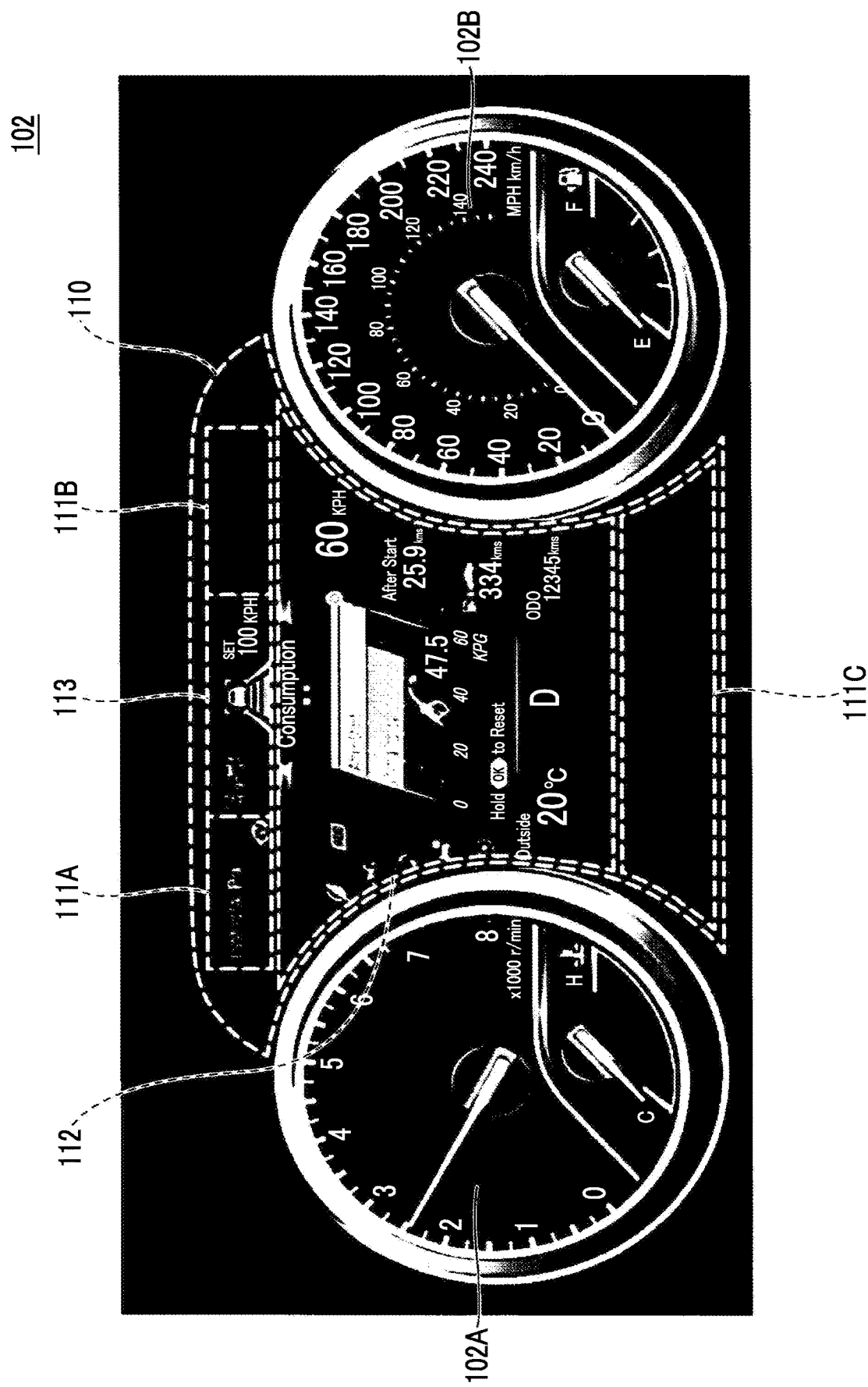
FIG. 2 is a diagram showing a meter panel including a display panel.

FIG. 2 is a diagram showing a meter panel 102 including the display panel 110. The meter panel 102 includes a tachometer 102A, a speedometer 102B, and the display panel 110. The tachometer 102A and the speedometer 102B each have a circular shape, and a water temperature gauge and a fuel gauge are respectively arranged under the tachometer and the speedometer. For example, the display panel 110 is disposed between two circles of the tachometer 102A and the speedometer 102B.

The display panel 110 is mainly divided into three regions, and includes dedicated display areas 111A, 111B, 111C, a main multi-display area 112, and a sub multi-display area 113. In the following description, the position of the unit is referred to as a top, bottom, right, or left portion in order to represent the positional relationship between the units within the display panel 110 shown in FIG. 2.

The dedicated display areas 111B, 111A are respectively provided on the right and left sides at the top portion of the display panel 110, and the dedicated display area 111C is provided at the bottom portion of the display panel 110. The dedicated display areas 111A, 111B, 111C are dedicated display areas that display predetermined information items of information items such as blind spot monitoring (BSM), rear cross-traffic alert (RCTA), outside air temperature, shift positions, and an odometer. The display contents of the dedicated display areas 111A, 111B, 111C are fixed on the above-mentioned information items, and the dedicated display areas are not able to switch between the display contents.

The main multi-display area 112 and the sub multi-display area 113 are display areas capable of switching between the display contents. The main multi-display area 112 is an example of a main multi-display area, and the sub multi-display area 113 is an example of a sub multi-display area.

The main multi-display area 112 is disposed between the dedicated display areas 111A, 111B and sub multi-display area 113 which are positioned at the top portion and the dedicated display area 111C which is positioned at the bottom portion in the center of the display panel 110 in the up-down direction.

For example, the main multi-display area 112 may display information items (contents) such as a guide image of the navigation system, acceleration guidance for energy-efficient driving, fuel consumption, and an image, a character, or a symbol representing radar cruise control (RCC) using a millimeter wave radar or lane departure alert (LDA). For example, the main multi-display area 112 displays an alert for a brake operation performed by an automatic braking system and an alert when a failure occurs in the vehicle on the information in a pop-up form.

The sub multi-display area 113 is disposed between the dedicated display areas 111A, 111B in the center at the top portion of the display panel 110. The sub multi-display area 113 displays a part of the information items (contents) to be displayed on the main multi-display area 112. For example, when information to be displayed on the main multi-display area 112 is generated in a state in which the sub multi-display area 113 does not display any information and the main multi-display area 112 is displaying the information selected by a user (for example, driver), the sub multi-display area 113 displays information to be displayed by the main multi-display area 112 and also displays the information selected by the user.

By doing this, the vehicular display device 100 constantly displays the information selected by the user on any one of the main multi-display area 112 and the sub multi-display area 113. Information desired to be displayed by the user is constantly displayed in this manner, and thus, appropriate information is able to be displayed for the user.

In this example, the information (hereinafter, referred to as selection information) selected (to be selected) by the user (for example, driver) is an example of a selection content, and is, for example, one or more information items of the guide image of the navigation system, the acceleration guidance for energy-efficient driving, the fuel consumption, and the information representing the RCC or LDA.

For example, "navigation and driving support" is used as the selection information for selecting the information items. The "navigation and driving support" is selection information for selecting two information items including information regarding the guide performed by the navigation system and information regarding driving support performed by the RCC or the LDA being activated.

When the "navigation and driving support" is selected, the image of the RCC, the image of the LDA, and the guide image of the navigation system are displayed on the main multi-display area 112 and/or the sub multi-display area 113.

Information to be selected as the selection information by the user may be appropriately selected and set among information items capable of being displayed on the main multi-display area 112 at the time of designing of the vehicular display device 100.

The selection information is information selected for setting an image to be displayed on the main multi-display area 112 and/or the sub multi-display area 113, and is not information for selecting the activation of a device corresponding to an image specified by the selection information. For example, a case where the image of the RCC is selected in the selection information and a case where (the activation of) the RCC is turned on and off are different from each other. Even though the image of the RCC is selected by the selection information, (the activation of) the RCC may be turned on or may be turned off.

Figures 3, 4:
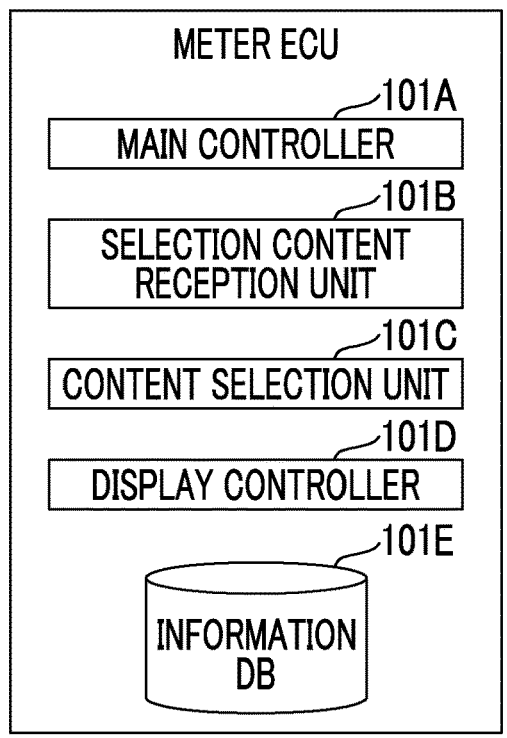
FIG. 3 is a diagram showing the configuration of a meter ECU.
FIG. 4 is a diagram showing data in a table form which represents priorities of information items to be displayed in a pop-up form.

FIG. 3 is a diagram showing the configuration of the meter ECU 101. FIG. 3 shows a functional block of the meter ECU 101 that executes a program for implementing the display method in the vehicular display device.

The meter ECU 101 includes a main controller 101A, a selection content reception unit 101B, a content selection unit 101C, a display controller 101D, and an information database (DB) 101E.

The main controller 101A is a controller that generally controls the processes of the meter ECU 101. The main controller 101A performs processes of the meter ECU 101 other than processes performed by the selection content reception unit 101B, the content selection unit 101C, and the display controller 101D.

The selection content reception unit 101B receives the information (selection information) selected by the user. One information item or a plurality of information items may be used as the selection information. The selection information is the guide image of the navigation system, the acceleration guidance for the energy-efficient driving, the fuel consumption, or the information representing the RCC or the LDA. For example, the user selects favorite information by operating the steering switch 21. The favorite information is used as the information (selection information) to be selected by the user. The selection of the favorite information is not limited to the selection using the steering switch 21, and favorite information may be selected by operating an operation unit present on a center console within a vehicle cabin, for example.

The content selection unit 101C selects information items to be displayed on the dedicated display areas 111A, 111B, 111C, the main multi-display area 112, and the sub multi-display area 113 of the display panel 110 among a plurality of information items stored in the information DB 101E. The information (selection information) to be selected by the user is also included in the information items stored in the information DB 101E, and the content selection unit 101C also displays the selection information on the display panel 110.

For example, the content selection unit 101C may select information which is included in an electronic device such as a smartphone terminal connected to the audio and navigation ECU 13 through wired communication or wireless communication or a memory connected to the audio and navigation ECU 13, in addition to the information items stored in the information DB 101E, and may display the selected information on the display panel 110. For example, information such as the play times or the titles of music files stored in a memory of a smartphone terminal of the user may be displayed on the display panel 110.

Information items representing the display contents of the dedicated display areas 111A, 111B, 111C may not be selected by the content selection unit 101C, and the display of these information items may be controlled by the display controller 101D.

The display controller 101D displays the information selected by the content selection unit 101C on the display panel 110.

FIG. 4 is a diagram showing data in a table form which represents priorities of information items to be displayed in a pop-up form. The priority of the information to be displayed in the pop-up form is a priority when the information to be displayed in the pop-up form is displayed on the main multi-display area 112, and has two (high and low) levels.

Information of which a predetermined priority is high is information for informing the user of an alert (for example, a brake or engine failure) for failure related to the running, turning, or stopping of the vehicle in addition to emergency braking.

Information of which a predetermined priority is low is the activation state of the RCC/LDA, door opening, audio, maintenance time, or an alert indicating that the RCC/LDA is not available due to bad weather.

FIGS. 5A and 5B are diagrams showing flowcharts representing processes performed by the meter ECU 101. FIGS. 6 to 15 are diagrams showing an image displayed on the display panel 110 by the meter ECU 101. It will be described in this example that the meter ECU 101 performs a process depending on a driving situation when the vehicle having the vehicular display device 100 mounted thereon is driven. The driving situation is a situation when the vehicle is being driven, and also includes a situation when a vehicle speed is zero. FIGS. 6 to 15 show the dedicated display areas 111A, 111B, the main multi-display area 112, and the sub multi-display area 113 of the display panel 110, and the dedicated display area 111C is omitted. "kms" on the display panel 110 is short for kilometers.

The main controller 101A starts the process (START). For example, the main controller 101A starts the process when an ignition switch of the vehicle is turned on. It will be described on the assumption that the navigation system is powered on and a destination is set by the user before a process of step S1 to be described below is performed after the process is started.

The selection content reception unit 101B determines whether the selection information is input by the user (step S1).

When the selection content reception unit determines that the selection information is input (S1: YES), the selection content reception unit 101B registers the selection information in the information DB 101E (step S2).

The content selection unit 101C determines whether the selection information is the "navigation and driving support" (step S3).

When the content selection unit determines that the selection information is not the "navigation and driving support" (S3: NO), the content selection unit 101C determines whether the RCC or the LDA is being activated (step S4). A case where the flow proceeds to step S4 corresponds to a case where the "navigation and driving support" is not selected as the selection information and the content selection unit determines whether the RCC or the LDA is being activated.

Figure 6:
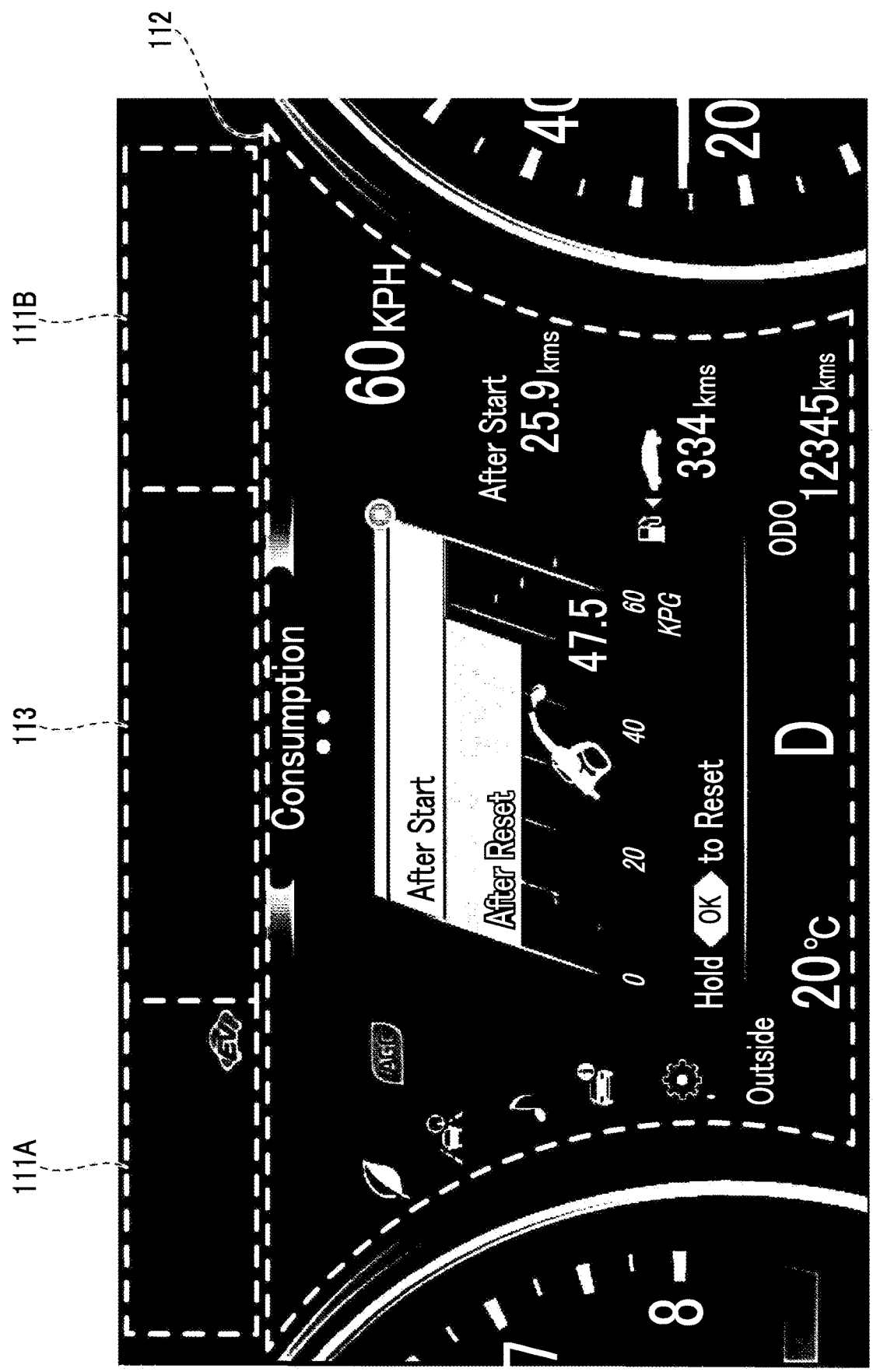
FIG. 6 is a diagram showing an image displayed on the display panel by the meter ECU.

When the content selection unit determines that the RCC or the LDA is not being activated (S4: NO), the content selection unit 101C selects an image representing average fuel consumption (step S5). As a result, the display controller 101D displays the image representing the average fuel consumption on the main multi-display area 112, as shown in FIG. 6. In FIG. 6, the sub multi-display area 113 does not display any information. The reason is that the information for the sub multi-display area 113 is not selected by the content selection unit 101C.

When the process of step S5 performed by the content selection unit 101C is ended, the main controller 101A determines whether to end the process (step S1E).

When the main controller determines to end that the process (S1E: YES), the main controller 101A ends a series of processes (END). For example, when the ignition switch of the vehicle is turned off, the main controller 101A determines to end the process. When the main controller determines not to end the process (S1E: NO), the main controller 101A returns the flow to step S1. In this step, the selection content reception unit determines whether the selection information is input by the user again.

When the content selection unit determines that the RCC or the LDA is being activated (S4: YES), the content selection unit 101C selects the image representing the average fuel consumption for the main multi-display area 112, and selects the information of the RCC and LDA for the sub multi-display area 113 (step S6).

Figure 7:
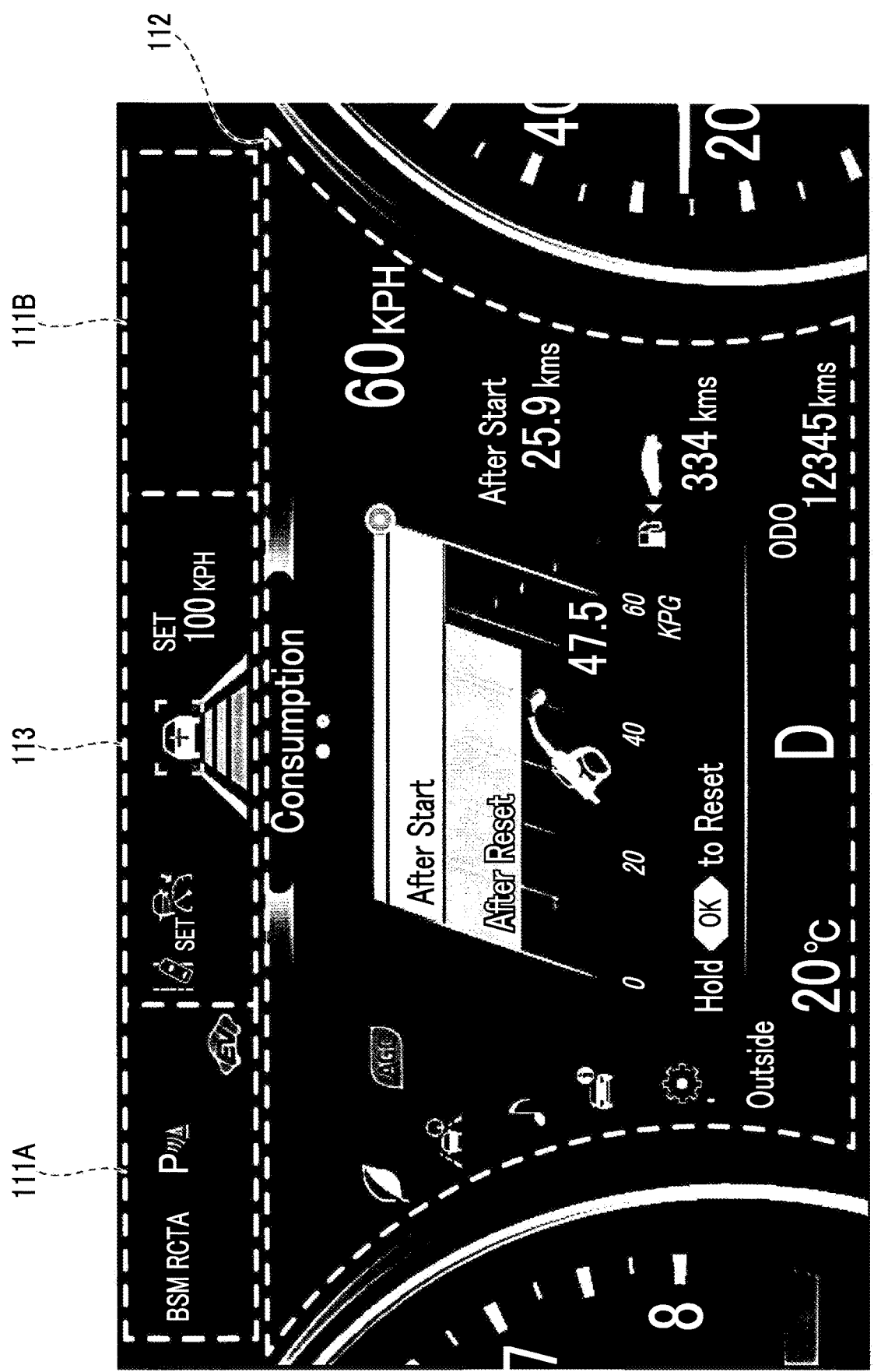
FIG. 7 is a diagram showing an image displayed on the display panel by the meter ECU.

As a result, the display controller 101D displays the image representing the average fuel consumption on the main multi-display area 112 and displays the information of the RCC and LDA on the sub multi-display area 113, as shown in FIG. 7. Both the images of the RCC and the LDA are displayed on the sub multi-display area 113 of FIG. 7. However, for example, when lanes are not being recognized in the LDA, the lanes on both sides of the vehicle within the sub multi-display area 113 are not displayed, and the RCC is solely displayed. When the following of a preceding vehicle is not being performed in the RCC, the LDA is solely displayed.

When the content selection unit determines that the selection information is the "navigation and driving support" (S3: YES) in step S3, the content selection unit 101C determines whether the RCC or the LDA is being activated (step S7).

When the content selection unit determines that the RCC or the LDA is not being activated (S7: NO), the content selection unit 101C determines whether a destination is being set in the navigation system and a distance to the intersection is equal to or less than a predetermined distance (step S8). A case where the RCC or the LDA is not being activated corresponds to a case where the RCC or the LDA is turned off.

When the content selection unit determines that the destination is being set and the distance to the intersection is not equal to or less than the predetermined distance (S8: NO), the content selection unit 101C selects a guide image of the navigation system for the main multi-display area 112 (step S9).

Figure 8:
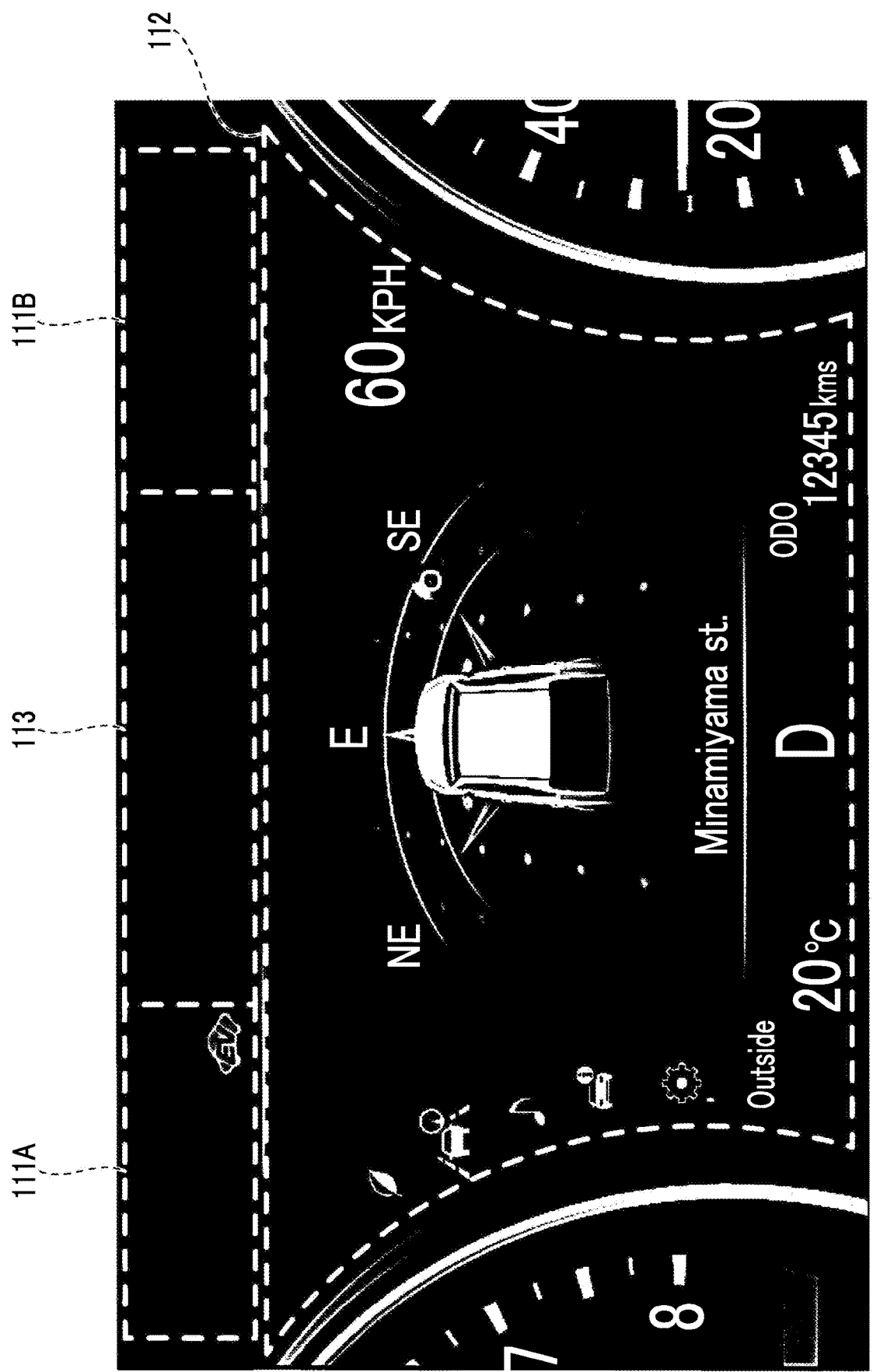
FIG. 8 is a diagram showing an image displayed on the display panel by the meter ECU.

As a result, the display controller 101D displays the guide image of the navigation system on the main multi-display area 112, as shown in FIG. 8. In FIG. 8, the sub multi-display area 113 does not display any information. The reason is that the information for the sub multi-display area 113 is not selected by the content selection unit 101C.

Figure 9:
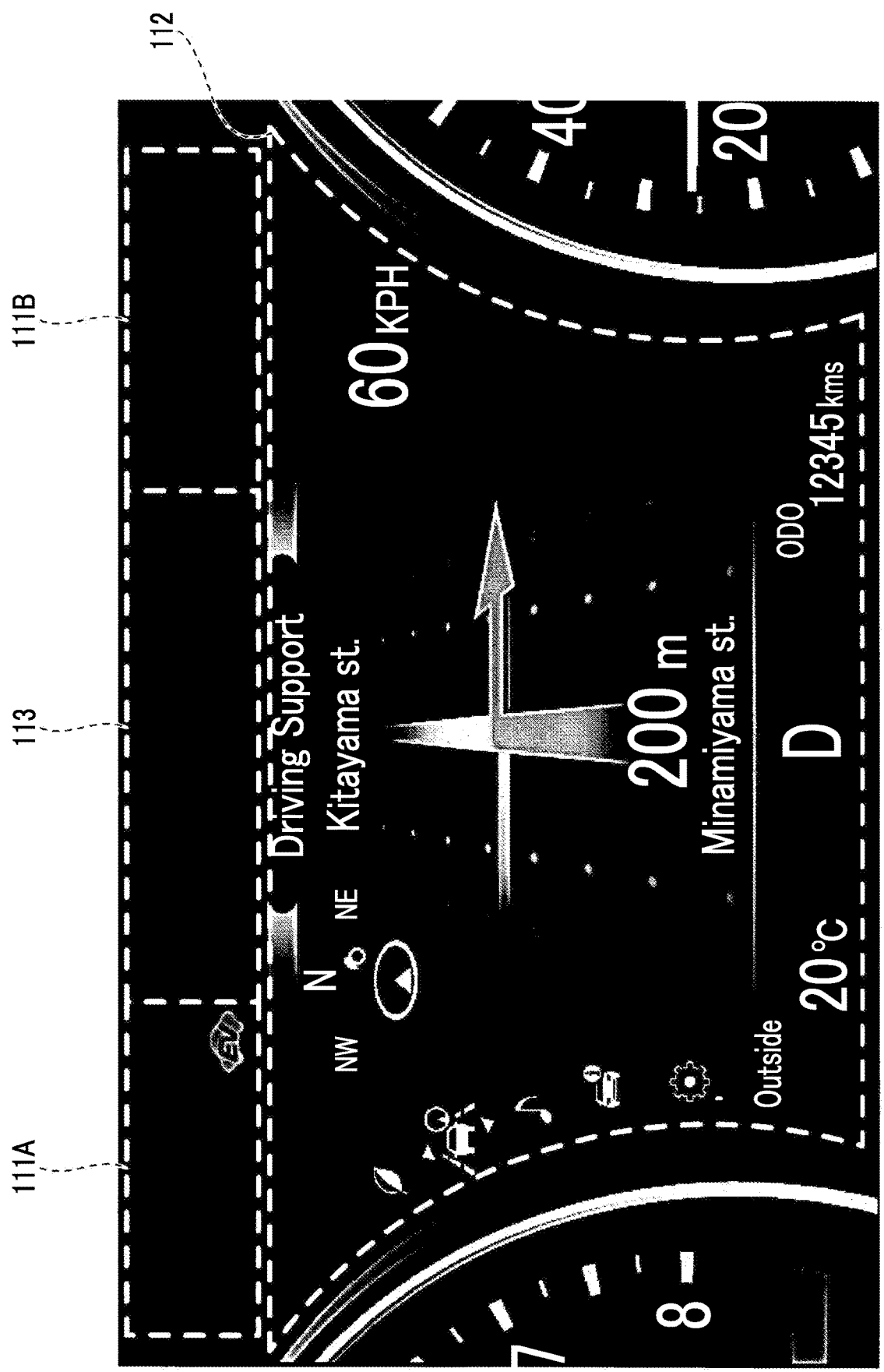
FIG. 9 is a diagram showing an image displayed on the display panel by the meter ECU.

Meanwhile, when the content selection unit determines that the destination is being set and the distance to the intersection is equal to or less than the predetermined distance (S8: YES), the content selection unit 101C selects a guide image representing a movement direction at the intersection for the main multi-display area 112 (step S10). As shown in FIG. 9, the display controller 101D displays a distance (200 m) to the intersection and a guide image representing a right turn at the intersection on the main multi-display area 112. The display of "Driving Support" in FIG. 9 means that driving support is being performed by the navigation system.

When the content selection unit determines that the RCC or the LDA is being activated in step S7 (S7: YES), the content selection unit 101C determines whether the destination is being set in the navigation system and the distance to the intersection is equal to or less the predetermined distance (step S11).

When the content selection unit determines that the destination is being set and the distance to the intersection is not equal to or less than the predetermined distance (S11: NO), the content selection unit 101C selects an image representing the guide image of the navigation system and the activation states of the RCC and the LDA for the main multi-display area 112 (step S12).

Figure 10:
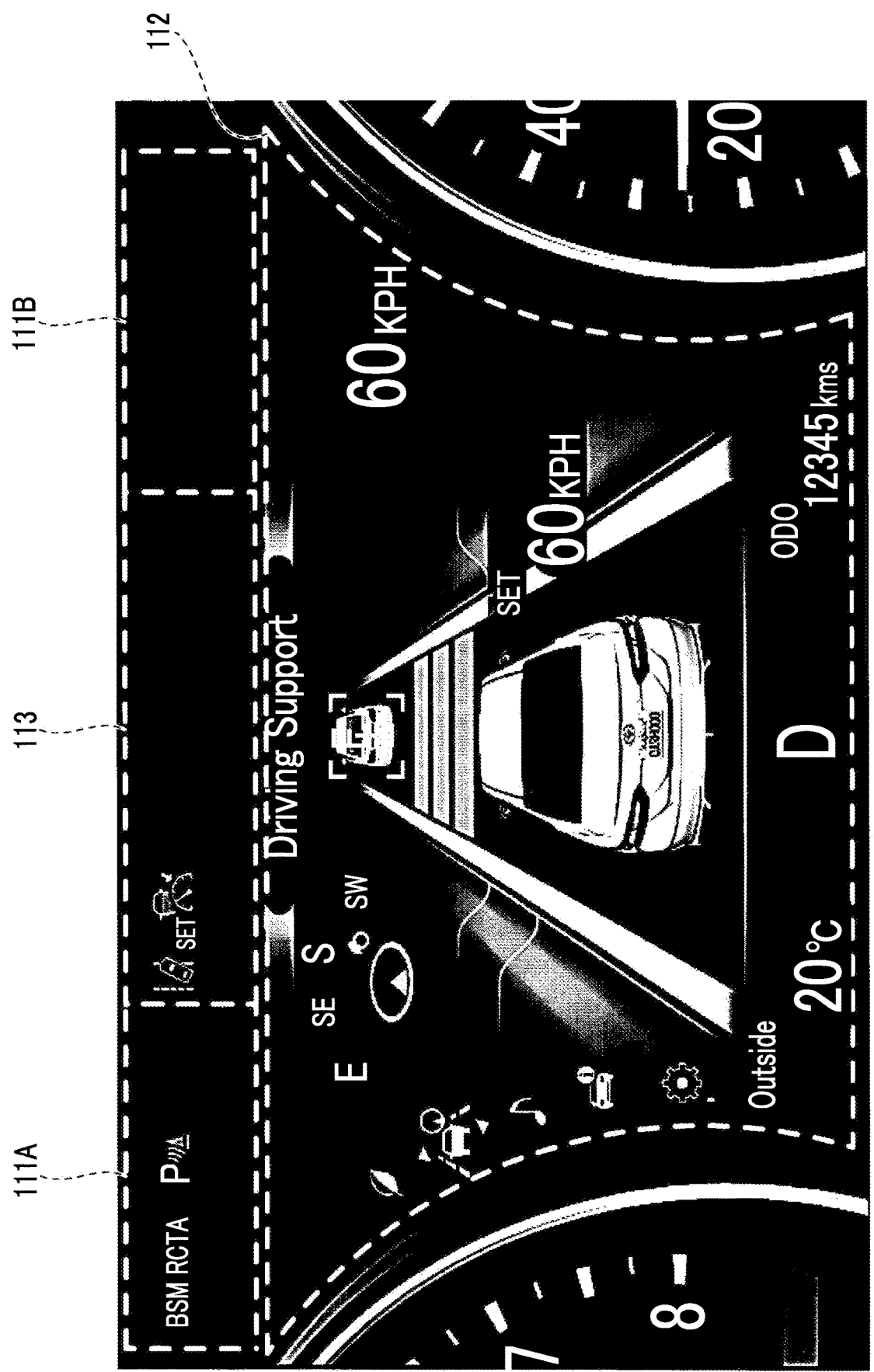
FIG. 10 is a diagram showing an image displayed on the display panel by the meter ECU.

As a result, the display controller 101D displays an image representing the guide of the navigation system and the activation states of the RCC and the LDA on the main multi-display area 112, as shown in FIG. 10. The image shown in FIG. 10 represents a direction (SW (southwest)) of the destination on the compass, as the guide of the navigation system. This image represents that the following of the preceding vehicle is being performed in the RCC and the lanes on both sides of the vehicle is being recognized in the LDA.

In FIG. 10, the sub multi-display area 113 does not display any information. The reason is that the information for the sub multi-display area 113 is not selected by the content selection unit 101C. The display of "Driving Support" in FIG. 10 means that the driving support is being performed by the navigation system and the RCC and LDA.

When the content selection unit determines that the destination is being set and the distance to the intersection is equal to or less than the predetermined distance (S11: YES), the content selection unit 101C determines whether there is information to be displayed in the pop-up form (in other words/pop-up information) (step S13).

When the content selection unit determines that there is no information to be displayed in the pop-up form (S13: NO), the content selection unit 101C selects the guide image of the navigation system for the main multi-display area 112, and selects the information of the RCC and LDA for the sub multi-display area 113 (step S14).

Figure 11:
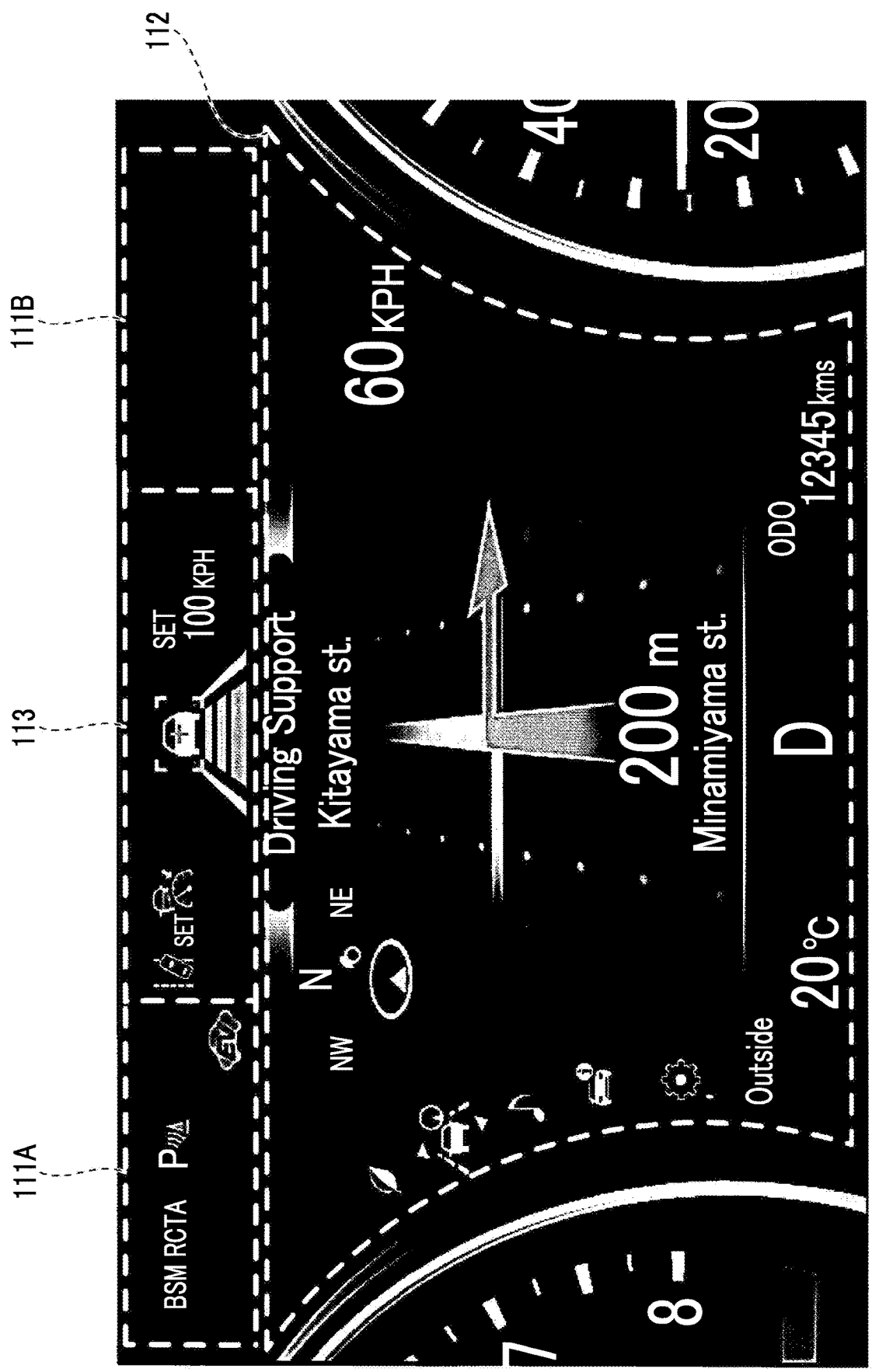
FIG. 11 is a diagram showing an image displayed on the display panel by the meter ECU.

As a result, the display controller 101D displays the guide image on the main multi-display area 112 and displays the information of the RCC and LDA on the sub multi-display area 113, as shown in FIG. 11. After the content selection unit determines that the determination result in step S11 is NO, when the vehicle moves and the distance to the intersection is equal to or less than the predetermined distance, the display of the main multi-display area 112 and the display of the sub multi-display area 113 are switched from FIG. 10 to FIG. 11.

A distance (200 m) to the intersection and a guide to turn right at the intersection are displayed on the guide image shown in FIG. 11, and an image representing that the following of the preceding vehicle is being performed in the RCC and the lanes on both sides of the vehicle are being recognized in the LDA is displayed on the sub multi-display area 113. The display of the guide to turn right at the intersection is an example of a content to be provided to the user. The display of "Driving Support" in FIG. 11 means that the driving support is being performed by the navigation system and the RCC and LDA.

Meanwhile, when the content selection unit determines that there is information to be displayed in the pop-up form (S13: YES), the content selection unit 101C determines whether a predetermined priority of the information to be displayed in the pop-up form is low (step S15).

When the content selection unit 101C determines that the priority is not low (S15: NO), the content selection unit 101C selects the information to be displayed in the pop-up form for the main multi-display area 112, and selects the information of the RCC and LDA for the sub multi-display area 113 (step S16).

Figure 12:
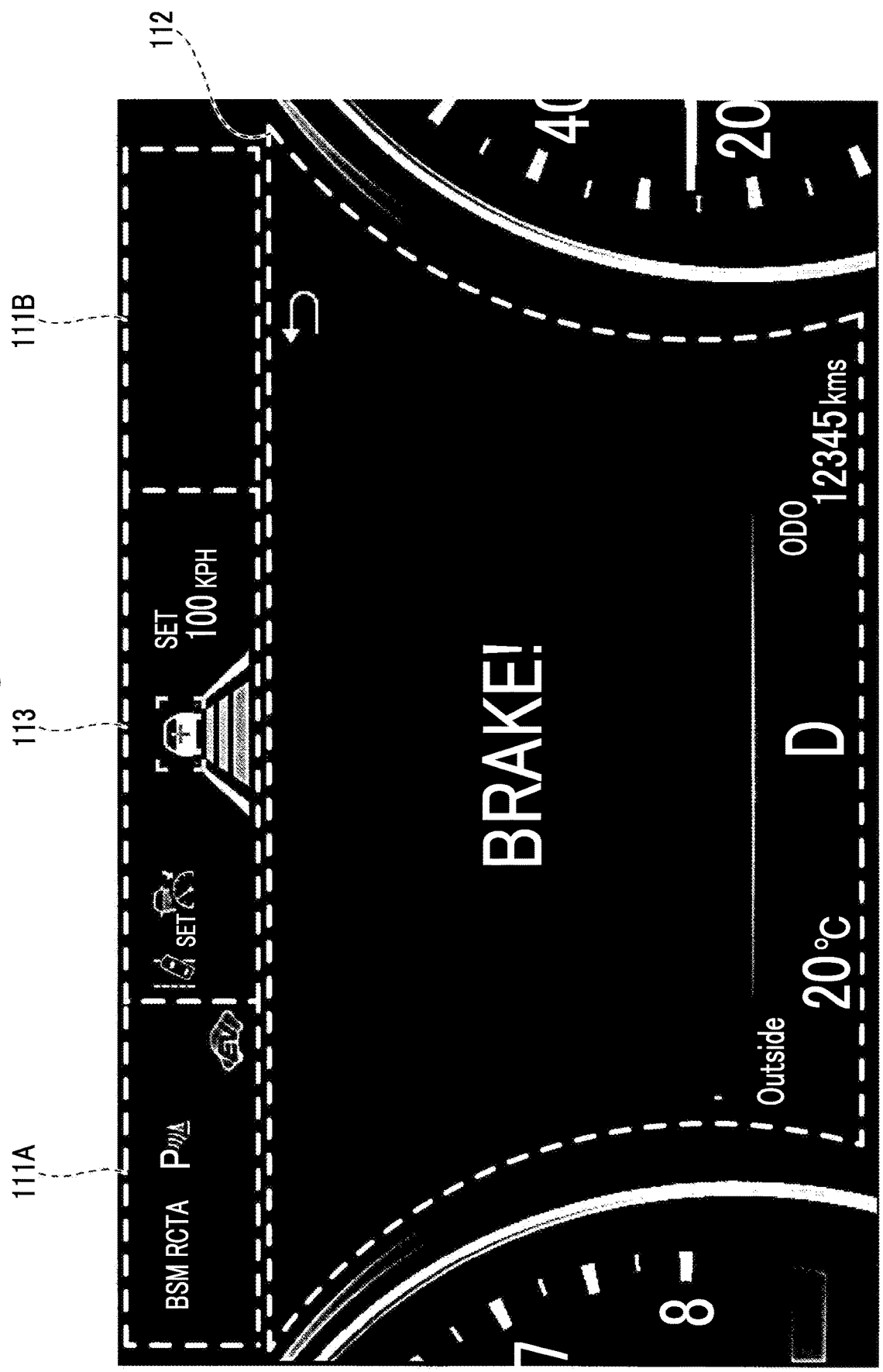
FIG. 12 is a diagram showing an image displayed on the display panel by the meter ECU.

As a result, the display controller 101D displays the information to be displayed in the pop-up form on the main multi-display area 112 and displays the information of the RCC and LDA on the sub multi-display area 113, as shown in FIG. 12. The information of which the priority is not low (is high), to be displayed in the pop-up form, is information (BRAKE!) indicating that a driver is requested to perform an emergency braking operation, as shown in FIG. 12. As stated above, information of which a predetermined priority is high, to be displayed in the pop-up form, is displayed in the pop-up form on the whole main multi-display area 112. The information to be displayed in the pop-up form is an example of the content to be provided to the user.

When the content selection unit determines that the predetermined priority is low (S15: YES), the content selection unit 101C determines whether the information to be displayed in the pop-up form is related to the RCC/LDA (step S17). For example, the information related to the RCC/LDA is "there are no preceding vehicles and RCC is not available" or "lanes are not recognizable".

When the content selection unit determines that the information to be displayed in the pop-up form is related to the RCC/LDA (S17: YES), the content selection unit 101C selects the guide image of the navigation system to be displayed on the main multi-display area 112, selects the information to be displayed in the pop-up form at the top portion of the main multi-display area 112, and selects the information of the RCC and LDA for the sub multi-display area 113 (step S18).

Figure 13:
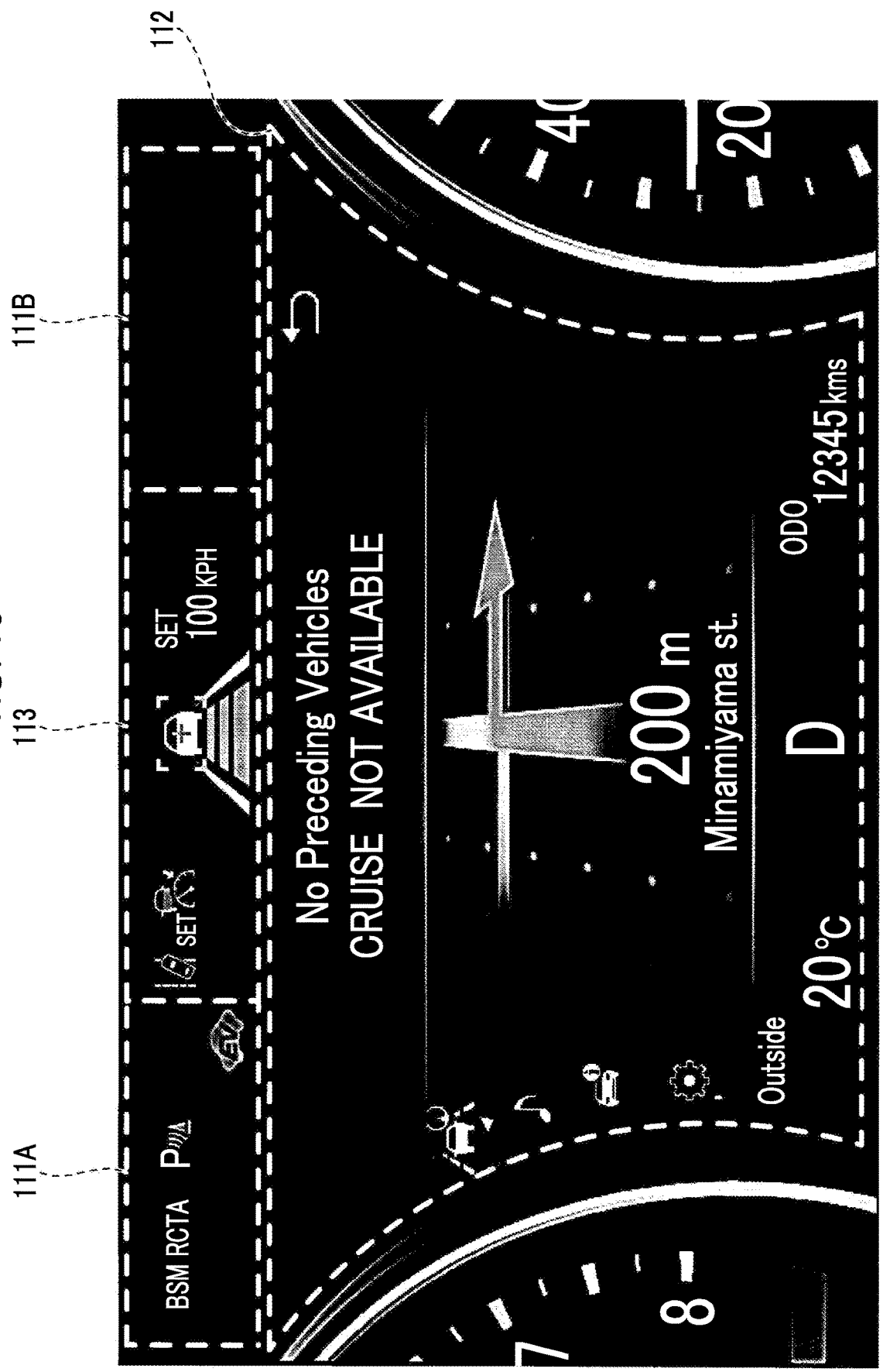
FIG. 13 is a diagram showing an image displayed on the display panel by the meter ECU.

As a result, the display controller 101D displays the guide image of the navigation system on the main multi-display area 112 and displays the information (No Preceding Vehicles (there are no preceding vehicles) and CRUISE NOT AVAILABLE (RCC is not available)) to be displayed in the pop-up form at the top portion of the main multi-display area 112, as shown in FIG. 13. The display controller 101D displays the information of the RCC and LDA on the sub multi-display area 113. The information to be displayed in the pop-up form is the "there are no preceding vehicles and RCC is not available", and is displayed at the top portion of the main multi-display area 112 so as to be superimposed on the guide image of the navigation system.

Since the information related to the RCC or the LDA is information related to the driving support and is significant information even though the priority thereof is low, the information related to the RCC or the LDA is displayed at the top portion of the main multi-display area 112.

When the content selection unit determines that the information to be displayed in the pop-up form is not related to the RCC/LDA (S17: NO), the content selection unit 101C determines whether the information to be displayed in the pop-up form is information to be displayed together with an image of the vehicle (step S19).

When the content selection unit determines that the information to be displayed in the pop-up form is the information to be displayed together with the image of the vehicle (S19: YES), the content selection unit 101C selects the guide image of the navigation system and selects the information to be displayed in the pop-up form in the right half of the main multi-display area 112, as the images to be displayed on the main multi-display area 112, and selects the information of the RCC and LDA for the sub multi-display area 113 (step S20).

Figure 14:
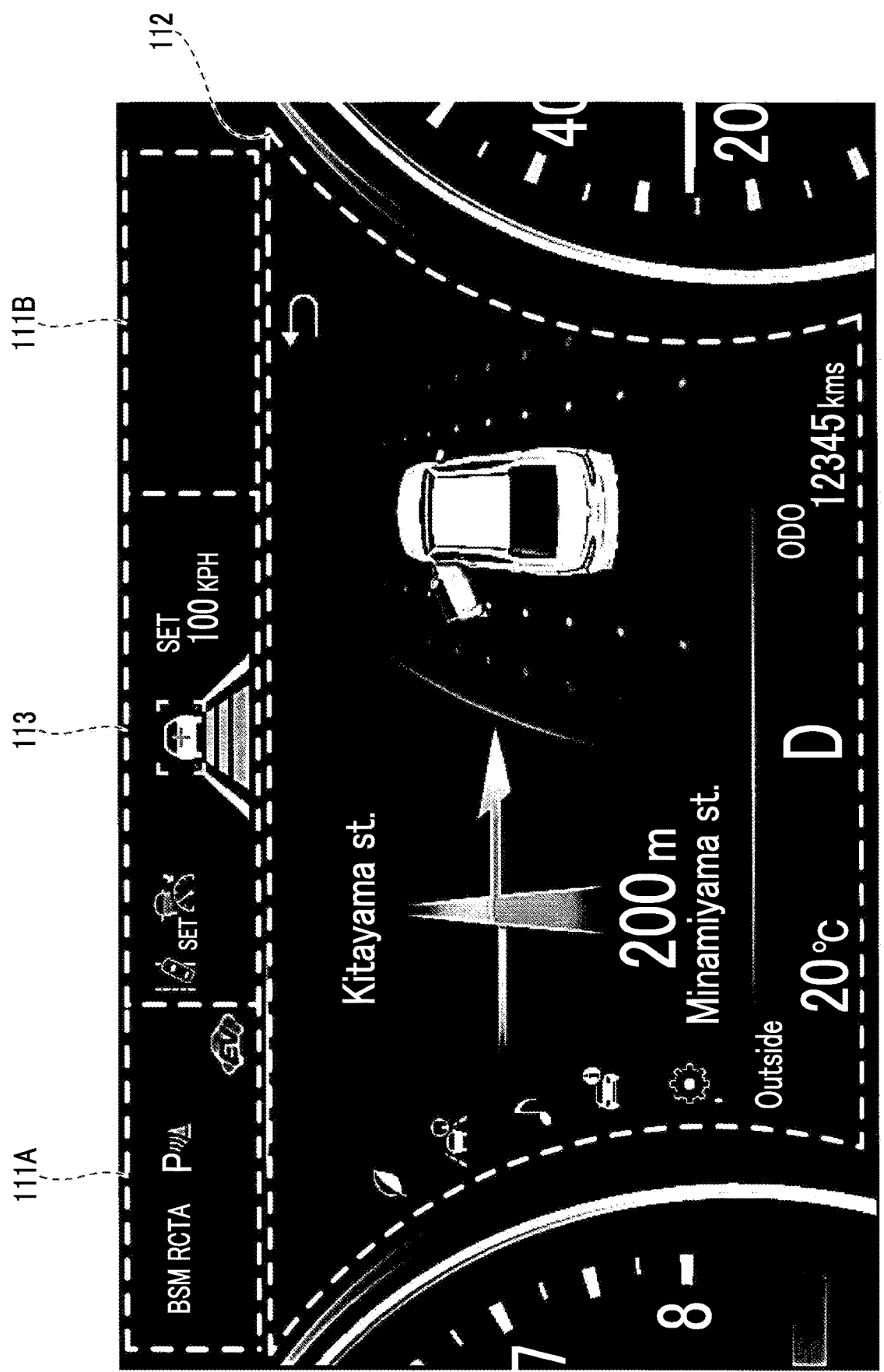
FIG. 14 is a diagram showing an image displayed on the display panel by the meter ECU.

As a result, the display controller 101D displays the guide image of the navigation system in the left half, as the image to be displayed on the main multi-display area 112 and displays the image of the vehicle in the pop-up form in the right half, as shown in FIG. 14. The display controller 101D displays the information of the RCC and LDA on the sub multi-display area 113. In FIG. 14, the image to be displayed in the pop-up form represents that the front left door of the vehicle is open.

Meanwhile, when the content selection unit determines that the information to be displayed in the pop-up form is not the information to be displayed together with the image of the vehicle (S19: NO), the content selection unit 101C selects guide image of the navigation system to be displayed on the main multi-display area 112, selects the information to be displayed in the pop-up form at the bottom portion of the main multi-display area 112, and selects the information of the RCC and LDA for the sub multi-display area 113 (step S21).

Figure 15:
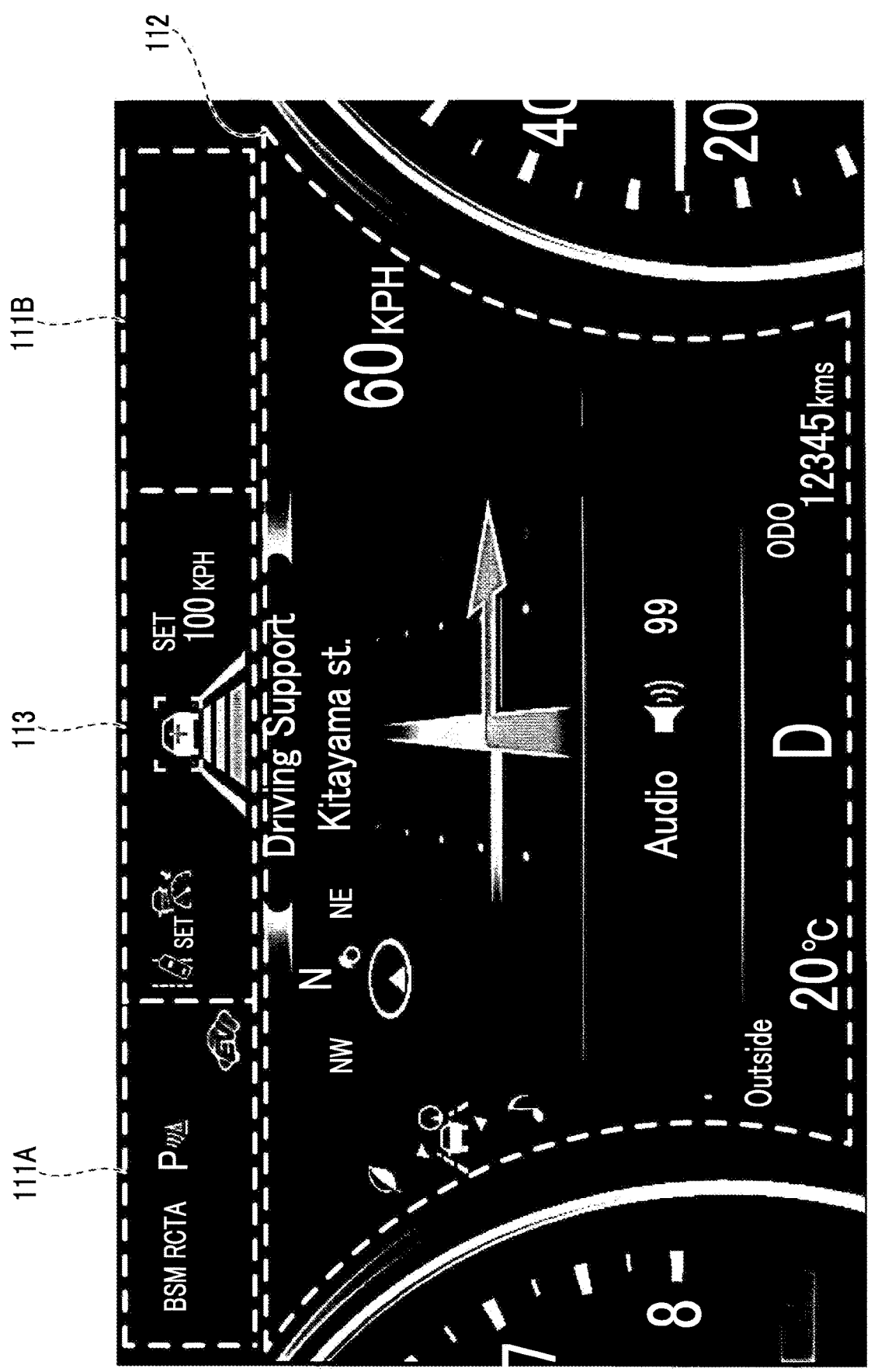
FIG. 15 is a diagram showing an image displayed on the display panel by the meter ECU.

As a result, the display controller 101D displays the guide image of the navigation system on the main multi-display area 112 and displays the information to be displayed in the pop-up form at the bottom portion of the main multi-display area 112, as shown in FIG. 15. The display controller 101D displays the information of the RCC and LDA on the sub multi-display area 113. The information to be displayed in the pop-up form is an audio volume, and is displayed at the bottom portion of the main multi-display area 112 so as to be superimposed on the guide image of the navigation system.

Since information related to the audio is information of which significance is lower than that of information related to the driving support, the information related to the audio is displayed at the bottom portion of the main multi-display area 112. The information to be displayed in the pop-up form at the bottom portion of the main multi-display area 112 may be displayed so as to slide upwards from the bottom, as an image of which information pops up from the vehicle.

The higher the predetermined priority is, the larger the information to be displayed in the pop-up form is displayed. The lower the predetermined priority is, the smaller the information to be displayed in the pop-up form is displayed. By doing this, the conspicuousness of the information (extent to which information can be noticed) is different. The conspicuousness of the information may be different by changing color or luminance in addition to the size of the information to be displayed in the pop-up menu.

Similarly to the case where the process of step S5 is ended, when the processes of steps S6, S9, S10, S12, S14, S16, S18, S20, S21 are ended, the main controller 101A determines whether to end the process (step S1E).

When the selection content reception unit determines that the selection information is not input (S1: NO), the selection content reception unit 101B selects default information (step S22).

When the default information is selected by the selection content reception unit 101B, the main controller 101A returns the flow to step S1. In this step, the selection content reception unit determines whether the selection information is input by the user again. The default information may be any information, or may be determined in advance.

As mentioned above, when the user selects the "navigation and driving support" as the selection information, the image for the driving support (RCC, LDA) of the navigation system and the driving support is constantly displayed on any one of the main multi-display area 112 and the sub multi-display area 113 in a state in which the navigation system and the RCC and LDA are being activated.

Accordingly, it is possible to constantly display the information (selection information) selected by the user on any one of the main multi-display area 112 and the sub multi-display area 113, and it is possible to provide the vehicular display device 100 that displays appropriate information for the user and the display method in the vehicular display device.

Although it has been described above that the image for the driving support (RCC, LDA) is constantly displayed on any one of the main multi-display area 112 and the sub multi-display area 113 when the user selects the "navigation and driving support" as the selection information, guide information of the navigation system may be constantly displayed on any one of the main multi-display area 112 and the sub multi-display area 113 in addition to the driving support (RCC, LDA) or instead of the driving support (RCC, LDA).

Although it has been described above that the user selects the "navigation and driving support" as the selection information, the user may select various information items as the selection information. Similarly to the image for the driving support (RCC, LDA), an image represented by the selection information selected by the user is constantly displayed on any one of the main multi-display area 112 and the sub multi-display area 113.

Although it has been described that the user selects the "navigation and driving support" as the selection information and two information items including the guide information of the navigation system and the information of the driving support performed by the RCC and LDA are used as the selection information.

However, although it has been described above that the selection information is the driving support performed by the RCC and LDA, the guide information of the navigation system may be displayed as the default information. In this case, the display contents of the main multi-display area 112 and the sub multi-display area 113 may be switched such that the information of the driving support (RCC and LDA) is moved to the sub multi-display area 113 and the guide information (guide to turn right at the intersection) is displayed on the main multi-display area 112 as shown in FIG. 11 from the state of FIG. 10 in which the image of the compass is displayed as the guide information on the main multi-display area 112 and the information of the driving support (RCC and LDA) is displayed as the selection information.

Although it has been described above that the information to be displayed in the pop-up form is the emergency braking, the alert for the failure, the activation state of the RCC/LDA, the door opening, the audio, or the alert indicating that the RCC/LDA is not available, various multimedia information items may be displayed. For example, in a situation in which the emergency braking or the alert does not need to be displayed in the pop-up form, when the vehicle is positioned on the national highway along the cost, an image representing a playlist of music files wanted to listen on the cost may be displayed. When any one of the music files is selected from the playlist, the steering switch 21 may be used. The multimedia information is not limited to the music, and information related to facilities such as restaurants, shops, and parks around the position of the vehicle or information (for example, information for informing of the occurrence time and location of a guerrilla rainstorm) related to the weather may be used.

Although it has been described above that the vehicle network system 10 performs communication conforming to a CAN protocol, the vehicle network system 10 is not limited to the communication conforming to the CAN protocol. For example, the vehicle network system may perform communication conforming to a protocol such as Ethernet (registered trademark) or Local Interconnect Network (LIN).

The sub multi-display area 113 may fixedly display the selection information.

Although the vehicular display device and the display method in the vehicle display device according to the exemplary embodiment of the disclosure have been described, the disclosure is not limited to the specifically disclosed embodiment, and may be variously modified or changed without departing from the scope of the claims.

What is claimed is:

1. A vehicular display device for a vehicle comprising:
   a main multi-display;
   a sub multi-display; and
   an electronic control unit (ECU) configured to receive selection contents selected by a user, the electronic control unit includes a central processing unit (CPU), a memory, a clock generator unit, an input and output interface, a communication interface, a transmission and reception unit, and an internal bus,
   wherein the ECU is further configured to
   select a content to be displayed among a plurality of contents including the selection contents, as one or both of one or more first contents and one or more second contents,
   select the selection contents as the one or more first contents or the one or more second contents depending on a situation of the vehicle,
   display the selection contents selected as the one or more first contents or the one or more second contents on the main multi-display or the sub multi-display,
   select the content to be provided to the user as a pop-up content to be displayed in a pop-up form on the one or more first contents when the selection contents are selected as the one or more first contents and the content to be provided to the user is generated depending on a driving situation of the vehicle in addition to the selection contents,
   display the pop-up content on the main multi-display, and display the selection contents selected as the one or more second contents on the sub multi-display area,
   display the pop-up content such that the higher a predetermined priority is, the larger the pop-up content is displayed and the lower the predetermined priority is, the smaller the pop-up content is displayed, and the predetermined priority has a high level and a low level,
   display the pop-up content of which the predetermined priority is in the high level on the whole main multi-display area in the pop-up form, and
   wherein
   the selection contents include contents of a navigation and driving support system,
   the navigation and driving support system includes a navigation system and at least one of radar cruise control (RCC) and lane departure alert (LDA),
   when a distance to an intersection set in the navigation system is equal to or less than a predetermined distance, contents of the navigation system are displayed on the main multi-display and the selection contents are displayed on the sub-multi-display,
   when the distance to the intersection set in the navigation system is more than the predetermined distance, the selection contents are displayed on the main multi-display, and
   when the distance to the intersection set in the navigation system is more than the predetermined distance, one or more activation states of at least one selected from the group of RCC or LDA are displayed on the main multi-display.

2. The vehicular display device of claim 1, wherein when the distance to the intersection set in the navigation system is more than the predetermined distance, an image representing a movement direction at the intersection is displayed on the main multi-display.

3. The vehicular display device of claim 1, wherein when the distance to the intersection set in the navigation system is equal to or less than the predetermined distance and the pop-up content is not selected, contents of the navigation system are displayed on the main multi-display as the one or more first contents and contents of the at least one of RCC and LDA are displayed on the sub multi-display as the one or more second contents.

4. The vehicular display device of claim 1, wherein when the distance to the intersection set in the navigation system is more than the predetermined distance, driving support by the navigation system and the radar cruise control and lane departure alert is displayed on the main multi-display.

5. The vehicular display device of claim 1, wherein when the distance to the intersection set in the navigation system is more than the predetermined distance, a direction of a destination is displayed on the main multi-display.

6. The vehicular display device of claim 1, when the distance to the intersection set in the navigation system is equal to or less than the predetermined distance, the electronic control unit is further configured to determine whether there is information to be displayed in a pop-up form.

7. The vehicular display device of claim 6, wherein when the electronic control unit determines there is no information to be displayed in the pop-up form, a guide image is displayed on the main multi-display.

8. The vehicular display device of claim 6, wherein when the electronic control unit determines there is no information to be displayed in the pop-up form, at least one selected from the group of radar cruise control or lane departure alert are displayed on the sub multi-display.

9. The vehicular display device of claim 6, wherein when the electronic control unit determines there is information to be displayed in the pop-up form, the electronic control unit is further configured to determine a predetermined priority of the information to be displayed in the pop-up form.

10. The vehicular display device of claim 9, wherein when the electronic control unit determines the predetermined priority of the information to be displayed in the pop-up form, the electronic control unit is further configured to determine whether the information to be displayed in the pop-up form is to be superimposed on the guide image.

11. A display method in a vehicular display device that includes an electronic control unit, a main multi-display, and a sub multi-display, the electronic control unit includes a central processing unit (CPU), a memory, a clock generator unit, an input and output interface, a communication interface, a transmission and reception unit, and an internal bus, the electronic control unit configured to receive one or more selection contents selected by a user, the main multi-display configured to display one or more first contents, and a sub multi-display configured to display one or more second contents, the display method comprising:
  receiving, by the electronic control unit, the one or more selection contents selected by the user;
  selecting, by the electronic control unit, a content to be displayed as one or both of the one or more first contents and the one or more second contents among a plurality of contents including the one or more selection contents;
  selecting, by the electronic control unit, the one or more selection contents as the one or more first contents or the one or more second contents depending on a situation of the vehicle;
  displaying, by the electronic control unit, the one or more selection contents selected as the one or more first contents or the one or more second contents on the main multi-display or the sub multi-display;
  selecting, by the electronic control unit, the content to be provided to the user as a pop-up content to be displayed in a pop-up form on the one or more first contents when the one or more selection contents are selected as the one or more first contents and the content to be provided to the user is generated depending on a driving situation of the vehicle in addition to the one or more selection contents;
  displaying, by the electronic control unit, the pop-up content on the main multi-display, and displaying the one or more selection contents selected as the one or more second contents on the sub multi-display;
  displaying, by the electronic control unit, the pop-up content such that the higher a predetermined priority is, the larger the pop-up content is displayed and the lower the predetermined priority is, the smaller the pop-up content is displayed, and the predetermined priority has a high level and a low level; and
  displaying, by the electronic control unit, the pop-up content of which the predetermined priority is in the high level on the whole main multi-display in the pop-up form,
  wherein
  the one or more selection contents include contents of a navigation and driving support system,
  the navigation and driving support system includes a navigation system and at least one of radar cruise control (RCC) and lane departure alert (LDA),
  the method further comprises displaying, by the electronic control unit, contents of a navigation system on the main multi-display and displaying, by the electronic control unit, the one or more selection contents on the sub multi-display when a distance to an intersection set in a navigation system is equal to or less than a predetermined distance;
  the method further comprises displaying, by the electronic control unit, the one or more selection contents on the main multi-display when the distance to the intersection set in the navigation system is more than the predetermined distance, and
  when the distance to the intersection set in the navigation system is more than the predetermined distance, the method further comprises displaying, by electronic control unit, one or more activation states of at least one selected from the group of RCC or LDA on the main multi-display.

12. The display method of claim 11, further comprising displaying, by the electronic control unit, an image representing a movement direction at the intersection on the main multi-display when the distance to the intersection set in the navigation system is more than the predetermined distance.

13. The display method of claim 11, further comprising, when the distance to the intersection set in the navigation system is equal to or less than the predetermined distance and the pop-up content of which the predetermined priority is in the high level is selected, displaying the pop-up content on the whole main multi-display in the pop-up form as the one or more first contents while the contents of the navigation system are not displayed on the main multi-display area and the contents of the at least one of RCC and LDA are displayed on the sub multi-display as the one or more second contents.

14. The display method of claim 11, further comprising displaying, by the electronic control unit, driving support by the navigation system and the radar cruise control and lane departure alert on the main multi-display when the distance to the intersection set in the navigation system is more the predetermined distance.

15. The display method of claim 11, further comprising displaying, by the electronic control unit, a direction of a destination on the main multi-display when the distance to the intersection set in the navigation system is more than the predetermined distance.

16. The display method of claim 11, further comprising determining, by the electronic control unit, whether there is information to be displayed in a pop-up form when the distance to the intersection set in the navigation system is equal to or less than the predetermined distance.

17. The display method of claim 16, further comprising displaying, by the electronic control unit, a guide image on the main multi-display when the electronic control unit determines there is no information to be displayed in the pop-up form.

18. The display method of claim 16, further comprising displaying, by the electronic control unit, at least one selected from the group of radar cruise control or lane departure alert on the sub multi-display when the electronic control unit determines there is no information to be displayed in the pop-up form.

19. The display method of claim 16, further comprising determining, by the electronic control unit, a predetermined priority of the information to be displayed in the pop-up form when the electronic control unit determines there is information to be displayed in the pop-up form.

20. The display method of claim 19, further comprising determining, by the electronic control unit, whether the information to be displayed in the pop-up form is to be superimposed on the guide image when the electronic control unit determines the predetermined priority of the information to be displayed in the pop-up form.

* * * * *